Feb. 1, 1955 V. E. GLEASMAN 2,700,985
ROTARY CONTROL VALVE
Filed Feb. 8, 1954 2 Sheets-Sheet 2
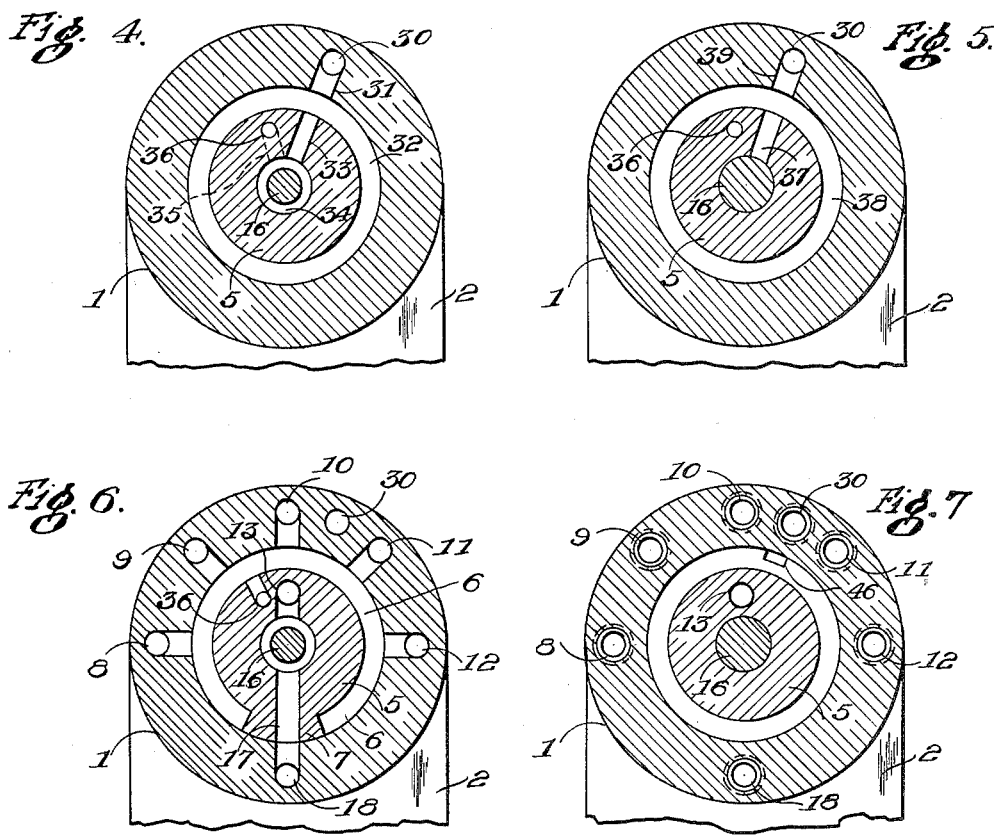
INVENTOR.
VERNON E. GLEASMAN

United States Patent Office 2,700,985
Patented Feb. 1, 1955

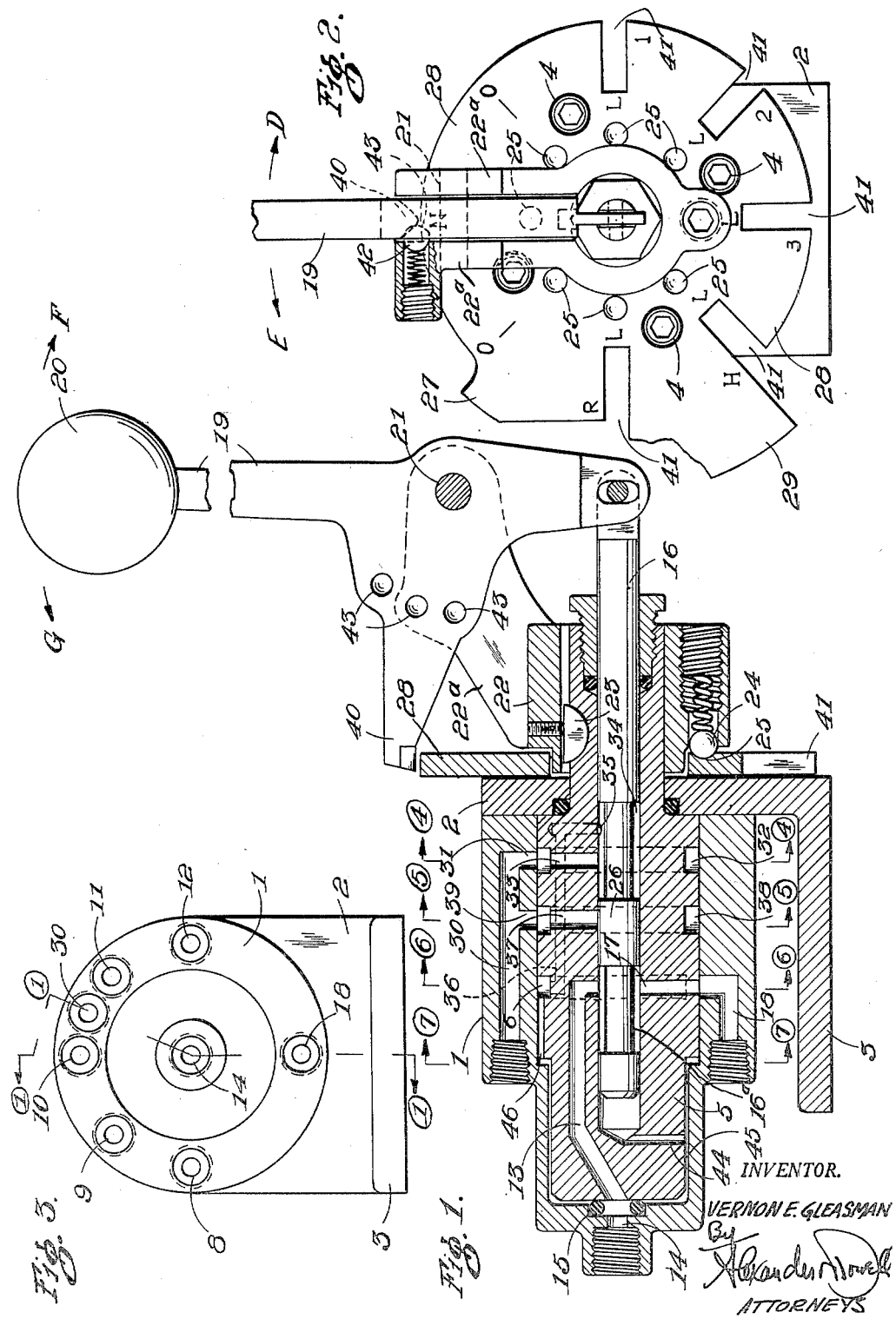

2,700,985

ROTARY CONTROL VALVE

Vernon E. Gleasman, Cleveland, Ohio

Application February 8, 1954, Serial No. 408,748

18 Claims. (Cl. 137—622.5)

This invention is a novel control valve, and is an improvement over the valve shown in my U. S. Letters Patent No. 2,177,213 issued October 24, 1939, and in my co-pending application Serial No. 402,755, filed January 7, 1954.

My present invention provides an improved valve designed for efficiency and simplicity in design for manufacture, and at the same time retains the same general principles as set forth in my prior Letters Patent No. 2,177,213; the same having substantially the same handbar arrangement; and my valve disclosed herein having the function of the two sections of the valve shown in my aforesaid patent combined into one, thereby greatly simplifying the design while retaining the same general functions. In addition to the features of compactness and simplification, my new design presents other advantages, such as providing for the index positioning numbers associated with a spring-pressed detent to hold the valve at the proper point of index.

Another object is to provide a control valve which may have other uses for controlling air of fluid where it is desirous to skip, or to select, various ports at random in either direction of indexing, the function of my novel valve being to control, in their proper sequence, a number of fluid-actuated clutches utilized in transmissions with counter-shafts, as set forth in my Letters Patent No. 2,177,213, and my Letters Patent No. 2,226,309 issued December 24, 1940; or in transmissions involving planetary gearing embodying multiple disc clutches and utilizing pistons for the engagement of bands, such as the hydra-matic transmissions presently manufactured by certain automobile manufacturing companies.

Although it is understood that air is a compressible fluid, the term "fluid" will be hereinafter referred to, and is intended to include air. The word "transmission" primarily relates to automotive and truck drives, but is not necessarily limited thereto. It may also include any other application where a transmission may be utilized, such as in a tractor, machine tool, or the like.

Transmissions such as the hydra-matic have attained a wide commercial acceptance for pleasure car use with automatic shift control. However, due to the wide range of working conditions that a truck is subjected to, automatic controls are not entirely satisfactory.

Considerable thought has been given to the design of a simple foolproof hand-control valve, but it has proven difficult to control a series of clutches so designed that they can be utilized in their proper sequence, and return the control handle back to neutral without the re-engagement of the various clutches that were engaged on the way up. For instance, in descending a hill it is sometimes desirous to re-engage the respective clutches for the purpose of gearing-down to restrain the load. Also, on some occasions it is desirable to skip a clutch either on the way up, or on the way back, with the selector lever.

The principal objects of the invention disclosed in my co-pending application are to provide a control valve which satisfies the above requirements in its entirety; also to provide a valve which will be foolproof in that only one clutch can be engaged at a time, thus avoiding stripping the gears in the transmission; also to provide a valve which will be flexible in design, in that by adding additional port holes it can satisfy any number of ratios.

One object of the present invention is to provide a valve which performs the above index functions while at the same time has an additional port associated therewith for the purpose of directing fluid to actuate a means to lock out fluid couplers and converters, or the like, and thus the primary purpose of my present valve is to provide an additional port to lockout a fluid coupling, or a fluid torque converter, and to control in proper sequence a number of fluid or air actuated clutches utilized in transmissions embodying countershafts for each respective ratio, as set forth in my Letters Patent No. 2,177,213, and my Letters Patent No. 2,226,309, when associated with a torque converter or a fluid coupling; also transmissions involving planetary gearing embodying multiple disc clutches, and utilizing pistons for the engagement of bands, such as in hydra-matic transmissions manufactured by General Motors, or when the above planetary arrangement is associated with a torque converter instead of a fluid coupling, as used in hydra-matic transmissions.

Another object of my present invention is to provide an index plate so arranged that the fluid coupling or torque converter can be safe-guarded against a change of ratio without first being unlocked. The purpose of unlocking the torque converter or a fluid coupling when changing gear ratios is to dampen out and absorb the shock that would normally occur in changing ratios; and more particularly, when a torque converter is utilized, it will provide an infinite ratio between gear levels.

Other objects of the invention will be hereinafter set forth.

Further objects and advantages will be apparent from the following specification taken in conjunction with the accompanying drawing in which:

Figure 1 represents a vertical cross-section taken on line 1—1 of Fig. 3.

Fig. 2 is a right hand end view, partly in section, of Fig. 1.

Fig. 3 is a left hand end view of Fig. 1.

Fig. 4 is a transverse section on line 4—4, Fig. 1.

Fig. 5 is a transverse section on the line 5—5, Fig. 1.

Fig. 6 is a transverse section on line 6—6, Fig. 1.

Fig. 7 is a transverse section on line 7—7, in the direction of the arrows, Fig. 1.

In the drawings, numeral 1 indicates a housing, one end of which is open, and this end is closed by a cover plate 2 forming an integral part of a mounting bracket 3, said cover 2 and housing being held in position by bolts 4 (Fig. 2) thereby forming an index chamber to accommodate a rotary mounted selector element 5 (Fig. 1) which is confined in the space provided by housing 1 and cover plate 2. The enlarged portion of rotary element 5 is provided with a channel-like groove 6 (Figs. 1 and 6) which nearly encircles said portion of the element. The remaining portion 7 (Fig. 6) will be hereinafter explained. The channel-like groove 6, as shown in Fig. 6, is in communication with ports 8, 9, 10, 11 and 12 of housing 1 which are hereinafter referred to as index ports. The rotary element 5 also has an internal duct 13 (Figs. 1 and 6) which is in communication with an inlet duct 14 (Figs. 1 and 3) in the closed end of housing 1. Between the closed end of housing 1 and the inner end of rotary element 5 provision is made to accommodate an O ring seal designated by 15, or the like, to effect a seal in said area.

From an inspection of Fig. 1, it can be seen that the inlet duct 13 is in communication with a plunger valve arrangement 16 (Figs. 1 and 6) having an enlarged portion 26. With this valve 16 in open position as shown in Figs. 1 and 6, fluid is allowed to flow into passage 17 around reduced portion 16a and out through duct 18 which is the fluid return line. Therefore, the valve 16 as shown in Fig. 1 is in "neutral" position, and at that time the associated pump (not shown) is by-passed, through its own conventional means, and therefore there can be no pressure build-up in the under ports 8, 9, 10, 11 and 12.

Mounted on an exterior projection of rotary element 5 (Fig. 1) is a control handle 19 provided with a knob, or the like 20. This control handle 19 serves a dual function, in that it is pivoted as at 21 on a bracket 22 for the purpose of actuating plunger valve 16 in axial relation to rotary valve element 5. At the same time, bracket 22 is mounted on the external extension of valve element 5 and keyed therewith by a key 23 of conventional form, so that control handle 19 may be swung around the axis of element 5 to index the rotary valve element 5 in the direction "D" (Fig. 2).

By an inspection of Figs. 2 and 6, it can be seen that by swinging the control handle 19 to the right (Fig. 2 or in direction D) to where the spring-pressed detent 24 (Fig. 1) engages one of the recesses 25 of Fig. 2 indicated by O, this is also a neutral position, as in this case the pump (not shown) of the system is by-passed through its own conventional means. At this position of indexing, the inlet duct 13 is pressurized through port 14 and in this position it can be seen from an inspection of Fig. 6 that the portion element 7, previously referred to, is correspondingly indexed in relation to control handle 19, and therefore index ports 8, 9, 10, 11 and 12 are now directly in communication with the return line 18 by and through the provision of annular channel 6. With this arrangement there can be no build-up of pressure, due to leakage, that normally would tend to engage a clutch or clutches.

By again advancing the control lever 19 in the direction D (Fig. 2) until the detent 24 registers with index station "1" (Fig. 2), it can be seen from an inspection of Fig. 6 that port 8 will now be in direct communication with the pressurized ducts 13 and 17, thereby engaging the corresponding clutch. By again advancing the control handle in the direction D until the detent registers with index station "2," fluid under pressure from ducts 13 and 17 will be directed into port 9 (Fig. 6), but in this position the portion 7 will have uncovered the port 8 that was previously pressurized, and through the channel 6, port 8 is bled-off through the return line 18. The control handle 19 can thus be advanced in this manner clear through to the fourth station marked H (Fig. 2) of the index range.

If desirous, the clutches can be picked up in reverse sequence by merely rotating the second handle 19 back in the opposite direction E (Fig. 2). If, however, it is not desirous to pick up the clutches in reverse sequence on the way back, by actuating control handle 19 in direction F (Fig. 1) the enlarged portion 26 of plunger valve 16 will be moved to the left (Fig. 1), thereby blocking the fluid in the pressurized passage 13 from entering passage 17. In this position of handle 19 the rotary element 5 (Figs. 1 and 6) can be rotated back to neutral position (direction E of Fig. 2) without effecting any of the respective clutches actuated by ports 12, 11, 10, 9 or 8 as the said ports are passed on the way back. It is this feature which enables skipping of any clutch, forward or backward, at the discretion of the operator, and enables neutralizing the valve at any point of index.

Reversing position is provided with a safe-guard in the form of a raised portion 27 (Fig. 2) of the index plate 28. Index plate 28 is also provided with an extended portion 29 which is extended to exceed the actuating range of control handle 19 to safeguard the reversing position from being approached from the wrong direction D (Fig. 2) of indexing.

The above arrangement and construction is substantially the same as that described and claimed in my co-pending application Serial No. 402,755, filed January 7, 1954, and therefore is not claimed herein.

The remaining function fo the present valve has provisions incorporated to facilitate the use of an additional duct whereby it can be used in combination with any of the index ducts that may be desired. By the provision of this additional duct transmissions, used in combination with fluid couplings or fluid torque converters, a means is provided in order that direct drive may be accomplished, if desired, for maximum efficiency under certain conditions.

The detail and the operational function of this additional duct is as follows:

In addition to index portions 8, 9, 10, 11 and 12 of housing 1 (Figs. 3, 6 and 7) an additional duct 30 (Fig. 1) is provided. This duct is shown in Figs. 4 and 5, and when in operation might be directly in communication with an hydraulically controlled fluid coupling or fluid converter lockout means, one type shown in my U. S. Letters Patents No. 2,177,213, and/or No. 2,226,309.

The valve element 5 has an axial bore receiving an axially slidable valve 16 having a reduced portion 16a (Fig. 1) which in the neutral position shown in Fig. 1 establishes communication between the inner end of bore 13 and the index duct 17; and valve 16 also has a second reduced portion 34 separated by a normal sized portion 26. The additional duct 30 of housing 1 has a radial duct 39 communicating with an annular channel 38 (Fig. 5) in element 5, which channel 38 has a radial bore 37 extending inwardly into the axial bore for valve 16. The additional duct 30 of housing 1 also has a second radial duct 31 communicating with an annular channel 32 (Fig. 4) in element 5, which channel 32 has a radial bore 33 extending inwardly into the axial bore for valve 16. The radial bores 17, 37 and 33 are disposed in spaced relation; and beyond the radial bore 33 is a bore 35 communicating through longitudinal bore 36 with the annular channel 6 of valve element 5.

With the valve 16 in the position as shown in Fig. 1, portion 26 of valve 16 is blocking the duct 37 and the duct 39 is in the unlocked position by reason of the fact that it is in communication with the return line 18, since duct 30 through duct 31 (Figs. 1 and 4) is in communication with the annular channel 32 (Fig. 4) of valve element 5. The radial duct 33 of element 5 (Figs. 1 and 4) is in communication with the chamber provided by the reduced portion 34 of valve 16. Also in communication with duct 33 through reduced portion 34 is the duct 35 (Figs. 1 and 4) which duct 35 is in communication with channel 6 (Figs. 1 and 6) through bore 36 (Figs. 1, 4, 5 and 6). Thus additional bore 30 is in direct communication with the return line 18, when the plunger valve 16 is in the neutral position shown in Fig. 1, with element No. 5 indexed to position O of Fig. 2 in which the enlarged portion 26 (Fig. 1) of valve 16 blocks the pressurized fluid in duct 13 from directly entering duct 37 (Figs. 1 and 5).

When it is desirous to pressurize duct 30 by actuating the control handle 19 in the direction of arrow G (Fig. 1), plunger valve 16 is shifted to the right (Fig. 1) and thereby the enlarged portion 26 of plunger valve 16 is positioned over ducts 33 and 35, thereby blocking the said respective ducts which were formerly in communication with return line 18. With the enlarged portion 26 in the position above described, duct 37 is now in communication with the pressurized duct 13, through the reduced portion 16a of valve 16, and thus fluid under pressure will be directed from bore 13 into the annular channel 38 of valve element 5 (Figs. 1 and 5). Since the duct 30 from bore 13 is in communication with the annular channel 38 through duct 39, said duct 30 is thus pressurized, and fluid will be directed to the locking means of the fluid coupling section, or the fluid torque converter section, activated by duct 30, whichever is utilized.

The reason for providing the valve element 5 with annular channels 32 and 38 is to insure that the control of the fluid is unaffected by the indexing of the other functional requirements of the valve.

It is a mechanical necessity that, when indexing from one index port (8, 9, 10, 11 and 12) to the other portions, the coupling or converter section must be in the unlocked position; therefore, an indexing plate is provided to safeguard against indexing without first unlocking the locking means by bleeding of bore 30. This feature is accomplished in the following manner:

The control handle 19 is pivotally connected with the outer end of valve 16 and provided with an extension 40 which overlies the periphery of the index plate 28 (Figs. 1 and 2). This index plate 28 is provided with a series of radial slots 41 which are also designated by index position L. In operation the slots 41 are the only points around the periphery of index plate 28 that control 19 is permitted to be actuated in direction G. Therefore, when actuated in direction G the fluid coupling or converter is in direct drive and further indexing is thereby prevented. Therefore, with this arrangement a change of ratio can not be accomplished without first removing the portion 40 of the control handle 19 from one of the slots 41. To hold the control handle in working relation, a ball detent 42 (Fig. 2) is provided, and associated therewith are three detent recesses 43 to hold the control handle 19 in each of its three working positions.

Control handle 19 is provided with a ball 20 at its outer end, and said handle 19 is pivoted as at 21 between parallel radially disposed ears or lugs 22a on a collar 22 which is keyed as at 23 on the extension of valve element 5 so that when handle 19 is rotated in the directions E or D (Fig. 2) the valve element 5 will be correspondingly rotated within housing 1 to bring same into indexing position with respect to index ports 8, 9, 10, 11 or 12, when the duct 30 is in unlocked position in which the valve 16 is in the position shown in Fig. 1. A spring pressed ball 24 (Fig. 1) is provided adapted to engage any of a series of depressions 25 disposed on the plate 28 with respect to each of the indexing positions L or O or the reversing position R (Fig. 2) of the valve element 5. The plate 28 is provided with shoulders 27 and 29 which are of greater radius than the major radius of said plate and which confine the rotary movement of handle 19 between the limit of swing of the indexing pistons "0," "1," "2," "3" and H of the valve element 5. The reversing position R of the valve element 5 is positioned between the shoulders 27 and 29 and the slot 41 thereof may be engaged by the extension 40 when the handle 19 is pivoted on pivot 21 into one of its three positions to lift the extension 40 above the shoulder 27 (Fig. 2).

The inner end of the bore for the plunger valve 16 has a small duct 44, provided to bleed-off the area so that the plunger valve 16 can be freely actuated. This small duct is in communication with the undersize portion (in respect to the housing 1) of valve element 5, thus forming an annular chamber 45 encircling valve element 5. This annular chamber 45 is in communication with the channel 6 by slot 46 (Figs. 1 and 7) which in turn is allowed to be bled-off through return line 18 when in operation.

Summarizing, my novel rotary control valve provides a rotary control valve element housed in a chamber, the exterior of the valve element accommodating a three-position valve actuating means, said means being rotatably mounted with the internal valve element; also provides a valve as above set forth having an index plate associated therewith to safeguard against undesirable combinations of control; also provides a valve as above set forth having a control valve and an independently controlled duct utilized in combination with a series of index ports.

I do not limit my invention to the exact form shown in the drawing, for obviously changes may be made therein within the scope of the claims.

I claim:

1. A control valve comprising a housing having a bore closed at one end and open at the other end; a cover plate having a hole secured across said open end; a rotatable index selector snugly fitting within the bore and having a reduced extension extending through the hole and having a circumferential peripheral groove therein nearly encircling the portion within the bore leaving an ungrooved portion between the ends of the groove; said selector having an offset bore extending therein communicating with an axial inlet port in the closed end of the housing, and having a transverse index duct at the inner end of the offset bore extending through the ungrooved portion of the selector adapted in neutral position of the selector to communicate through said groove with an outlet port in the closed end of the housing; said housing having a series of spaced index ports therein opposite said outlet port and adapted in neutral position of the selector to all register with the groove; said selector having an axial bore extending thereinto through said extension; an axially slidable valve in said axial bore having spaced reduced portions separated by a normal sized portion; an additional longitudinal bore extending into the housing substantially opposite the outlet port; said selector having a pair of other spaced circumferential annular peripheral grooves spaced from the first groove; radial ducts connecting the additional bore through said pair of other circumferential grooves respectively with the axial selector bore; a further duct in the selector connecting the first groove with the axial bore adjacent the outermost of said other radial ducts, whereby when the slidable valve is in neutral position the innermost reduced portion thereof will connect the inlet and outlet ports of the housing, and the outermost reduced portion thereof will connect the additional bore with the outlet port, and whereby when the slidable valve is in another position the normal-sized portion thereof will block communication between the outermost radial duct and said further duct, and said innermost reduced portion will connect the first bore and the innermost radial slot to pressurize said additional bore; the fluid in neutral position of the selector passing from the inlet port through the offset bore of the selector and out through the said outlet port preventing pressure build-up in the circumferential grooves and additional bore.

2. In a valve as set forth in claim 1, the inner end of axial bore of the selector having bleeder ducts communicating with the space between the inner end of the selector and the closed end of the housing and discharging into the first circumferential groove.

3. In a valve as set forth in claim 1, said cover forming an integral portion of an L-shaped supporting bracket.

4. In a control valve as set forth in claim 1; a second rotary position of said selector wherein the ungrooved portion of the selector is disposed between the outlet port and the first of said arcuate series of index ports and wherein one end of said first circumferential groove registers with the outlet port preventing build-up of pressure in said groove, thereby providing a second neutral position of the selector; other positions of said selector wherein the index duct in the selector communicates with the others of the series of arcuate index ports respectively, thereby pressurizing said ports; the previously pressurized ports being bled off through the first circumferential channel and the outlet port, and the ports of the arcuate series being pressurized in sequence by rotation of the selector in the opposite direction.

5. A control valve comprising a housing having a bore closed at one end and open at the other end; a cover plate having a hole secured across said open end; a rotatable index selector snugly fitting within the bore and having a reduced extension extending through the hole and having a circumferential peripheral groove therein nearly encircling the portion within the bore leaving an ungrooved portion between the ends of the groove; said selector having an offset bore extending therein communicating with an axial inlet port in the closed end of the housing, and having a transverse index duct at the inner end of the offset bore extending through the ungrooved portion of the selector adapted in neutral position of the selector to communicate through said groove with an outlet port in the closed end of the housing; said housing having a series of spaced index ports therein opopsite said outlet port and adapted in neutral position of the selector to all register with the groove; said selector having an axial bore extending thereinto through said extension; an axially slidable valve in said axial bore having spaced reduced portions separated by a normal sized portion; an additional longitudinal bore extending into the housing substantially opposite the outlet port; said selector having a pair of other spaced circumferential annular peripheral grooves spaced from the first groove; radial ducts connecting the additional bore through said pair of other circumferential grooves respectively with the axial selector bore; a further duct in the selector connecting the first groove with the axial bore adjacent the outermost of said other radial ducts, whereby when the slidable valve is in neutral position the innermost reduced portion thereof will connect the inlet and outlet ports of the housing, and the outermost reduced portion thereof will connect the additional bore with the outlet port, and whereby when the slidable valve is in another position the normal-sized portion thereof will block communication between the outermost radial duct and said further duct, and said innermost reduced portion will connect the first bore and the innermost radial slot to pressurize said additional bore; the fluid in neutral position of the selector passing from the inlet port through the offset bore of the selector and out through the said outlet port preventing pressure build-up in the circumferential grooves and additional bore; a handle on said selector extension for rotation therewith; and said handle being pivoted on said extension and pivoted to said slidable valve for effecting axially slidable movement of said valve.

6. In a valve as set forth in claim 5, the inner end of axial bore of the selector having bleeder ducts communicating with the space between the inner end of the selector and the closed end of the housing and discharging into the first circumferential groove.

7. In a valve as set forth in claim 5, said cover forming an integral portion of an L-shaped supporting bracket.

8. In a control valve as set forth in claim 5; a second rotary position of said selector wherein the ungrooved portion of the selector is disposed between the outlet port and the first of said arcuate series of index ports and wherein one end of said first circumferential groove registers with the outlet port preventing build-up of pressure in said groove, thereby providing a second neutral position of the selector; other positions of said selector wherein the index duct in the selector communicates with the others of the series of arcuate index ports respectively, thereby pressurizing said ports; the previously pressurized ports being bled off through the first circumferential channel and the outlet port, and the ports of the arcuate series being pressurized in sequence by rotation of the selector in the opposite direction.

9. In a valve as set forth in claim 5, fixed shoulders on the cover serving as a stop to normally limit the indexing rotary movement of the selector handle and in the indexing direction to pressurize the last of the series of index ports; and means on the handle when actuated to permit the handle to be swung in a direction contrary to the normal rotary indexing direction into "reverse" position.

10. In a valve as set forth in claim 9, said "reverse" position being disposed between the said shoulders; and said handle having a finger; an arcuate plate on the cover having radial slots therein disposed opposite each of said indexing and reversing positions of said selector element; and means whereby when the handle is operated axially of the selector in one direction the finger will be shifted out of the path of said stops.

11. In a valve as set forth in claim 5, said extension having an indexing spring pressed detent cooperating with indicia on the cover corresponding with the positions into which the selector is swung by the handle, and said cover having indicia indications depressions receiving said detent.

12. A control valve comprising a cylindrical housing having a central circular bore, and having a closed end and an open end; a cover plate having a central circular hole secured across the said open end; a rotatable cylindrical index selector making a snug fit within the housing bore, said selector having a reduced extension extending through the hole in the cover plate, said selector having a circumferential groove nearly encircling the portion within the housing bore leaving an ungrooved portion between the ends of the groove; said selector having an offset bore extending therein communicating at its inner end with an axial inlet port in the closed end of the housing, and having an index duct opposite the inner end of the offset bore extending through the ungrooved portion of the selector adapted in neutral position of the selector to communicate with an outlet port in the closed end of the housing; said housing having an arcuate series of spaced index ports therein diametrically opposite the said outlet port and adapted in neutral position of the selector to all register with the circumferential groove; said selector having an axial bore extending from a point adjacent its inner end through said reduced extension of the selector; an axially slidable valve in said axial bore having spaced reduced portions separated by a normal sized portion filling the axial bore; an additional bore in the housing substantially opposite the outlet port; said selector element having a pair of other spaced circumferential annular grooves in its periphery spaced from the first circumferential groove; radial ducts connecting the additional bore with said pair of other circumferential grooves respectively; other radial ducts connecting said other circumferential grooves with the axial bore of the selector; a further duct extending through the selector having one end communicating with the first circumferential groove and its other end communicating with the axial bore adjacent one of said other radial ducts whereby when the slidable valve is in neutral position one reduced portion of the valve will establish communication between the inlet and outlet ports of the housing, and the other reduced portion of the valve will establish communication between the additional bore and the outlet port, and whereby when the slidable valve is in another position the normal-sized portion of the valve will block communication between said one radial duct and said further duct, and said first reduced portion will establish communication between the first bore and the other radial slot to pressurize said additional bore; the fluid in neutral position of the selector passing from the inlet port through the offset bore of the selector and out through the said outlet port preventing pressure build-up in the circumferential groove; a handle on said selector extension for rotation therewith; and said handle being pivoted on said extension and pivoted to said slidable valve for effecting axially slidable movement of said valve.

13. In a valve as set forth in claim 12, the inner end of axial bore of the selector having bleeder ducts communicating with the space between the inner end of the selector and the closed end of the housing and discharging into the first circumferential groove.

14. In a valve as set forth in claim 12, said cover forming an integral portion of an L-shaped supporting bracket.

15. In a control valve as set forth in claim 12; a second rotary position of said selector wherein the ungrooved portion of the selector is disposed between the outlet port and the first of said arcuate series of index ports and wherein one end of said first circumferential groove registers with the outlet port preventing build-up of pressure in said groove, thereby providing a second neutral position of the selector; other positions of said selector wherein the index duct in the selector communicates with the others of the series of arcuate index ports respectively, thereby pressurizing said ports; the previously pressurized ports being bled off through the first circumferential channel and the outlet port, and the ports of the arcuate series being pressurized in sequence by rotation of the selector in the opposite direction.

16. In a valve as set forth in claim 12, fixed shoulders on the cover serving as a stop to normally limit the indexing rotary movement of the selector handle and in the indexing direction to pressurize the last of the series of index ports; and means on the handle when actuated to permit the handle to be swung in a direction contrary to the normal rotary indexing direction into "reverse" position.

17. In a valve as set forth in claim 16, said "reverse" position being disposed between the said shoulders; and said handle having a finger; an arcuate plate on the cover having radial slots therein disposed opposite each of said indexing and reversing positions of said selector element; and means whereby when the handle is operated axially of the selector in one direction the finger will be shifted out of the path of said stops.

18. In a valve as set forth in claim 12, said extension having an indexing spring pressed detent cooperating with indicia on the cover corresponding with the positions into which the selector is swung by the handle, and said cover having indicia indications depressions receiving said detent.

No references cited.